United States Patent
Chou et al.

(10) Patent No.: US 7,231,444 B1
(45) Date of Patent: Jun. 12, 2007

(54) METHOD AND MANAGEMENT PORT FOR AN INDIRECT LOOP PROTOCOL ASSOCIATED WITH AN INTERCONNECT DEVICE

(75) Inventors: Norman Chou, San Jose, CA (US);
Olivier Cremel, Palo Alto, CA (US);
Richard Schober, Cupertino, CA (US);
Ian Colloff, Los Gatos, CA (US)

(73) Assignee: Palau Acquisition Corporation (Delaware), Santa Clara, CA (US)

( * ) Notice: Subject to any disclaimer, the term of this patent is extended or adjusted under 35 U.S.C. 154(b) by 1035 days.

(21) Appl. No.: 09/948,875

(22) Filed: Sep. 7, 2001

(51) Int. Cl.
*G06F 15/173* (2006.01)
*G06F 15/16* (2006.01)

(52) U.S. Cl. .................. 709/225; 709/200; 709/202

(58) Field of Classification Search ............. 709/200, 709/202, 225, 229; 370/229, 401; 710/316
See application file for complete search history.

(56) References Cited

U.S. PATENT DOCUMENTS

| | | | | |
|---|---|---|---|---|
| 5,867,728 | A * | 2/1999 | Melo et al. | 710/8 |
| 5,887,194 | A * | 3/1999 | Carson et al. | 710/36 |
| 6,006,303 | A * | 12/1999 | Barnaby et al. | 710/244 |
| 6,175,889 | B1 * | 1/2001 | Olarig | 710/309 |
| 6,894,972 | B1 * | 5/2005 | Phaal | 370/229 |
| 6,920,106 | B1 * | 7/2005 | Chou et al. | 370/229 |
| 6,950,394 | B1 * | 9/2005 | Chou et al. | 370/229 |
| 7,009,947 | B2 * | 3/2006 | Hunzinger | 370/328 |

OTHER PUBLICATIONS

"InfiniBand Switch Chip Runs at 10 Gbps On Eight Ports", Nicholas Cravotta, Nov. 8, 2001, EDN, 1 page.

"Assemble Fast Switch Fabrics With 32-Port InfiniBand Node p. 60", Electronic Design, Oct. 15, 2001, 4 pages.

"RedSwitch, Inc. Announces Industry's Highest Performance and Highest Integration InfiniBand Switch Chip", RedSwitch Press Release, Oct. 16, 2001, 2 pages.

"RedSwitch Gearing Up To Launch New Chip", Steve Tanner, Silicon Valley Business Ink, Oct. 26, 2001, 3 pages.

"Mellanox Intergrates Serdes Into Infiniband Switch", Jerry Ascierto EE Times, Oct. 23, 2001, 3 pages.

"Switch Chip Expands InfiniBand Integration", EEM File 3130, Tony Chance, 2 pages.

"RedSwitch Announces 16 Gbyte/s Throughout Switch Product for RapidIO Architecture", RedSwitch Press Release, Milpitas, Calif., May 15, 2001, Tony Chance,May 15, 2001, 2 pages.

"RedSwitch and Agilent Technologies Unveil 160-GB/s Throughput Switch Product for InfiniBand Architecture", RedSwitch Press Release, Intel Developer Forum Conference, San Jose, Calif., Feb. 27, 2001, Mark Alden-Agilent, Tony Chance-RedSwitch, 2 pages.

\* cited by examiner

*Primary Examiner*—John B. Walsh
(74) *Attorney, Agent, or Firm*—Anne Kinsman; Borden Ladner Gervais LLP

(57) ABSTRACT

A method and management port for an indirect loop protocol associated with an interconnect device. In one embodiment, a method to handle a request sent to an interconnect device includes receiving the request at a destination switch from a host network adapter; generating a response to the request in the destination switch; and returning the response to the host network adapter, wherein the destination switch includes a management port for addressing the interconnect device that implements an indirect loop protocol.

26 Claims, 8 Drawing Sheets

| | bits<br>words<br>(no CRH) | 31-24 | 23-16 | 15-8 | 7-0 |
|---|---|---|---|---|---|
| LRH | 0 | VL | LVer | ( SL ) | (rsv) | LNH | DLID | |
| | 1 | (resv 5) | PktLen | SLID | |
| | 2 | IP Vers | (Traffic Class) | (Flow Label) | |
| GRH | 3 | PayLen | | NxtHdr | HopLmt |
| | 4 | Source Address_1) S_GID1 | | | |
| | 5 | Source Address_2) S_GID2 | | | |
| | 6 | Source Address_3) S_GID3 | | | |
| | 7 | Source Address_4) S_GID4 | | | |
| | 8 | DGID_1 | | | |
| | 9 | DGID_2 | | | |
| | 10 | DGID_3 | | | |
| | 11 | DGID_4 | | | |
| BTH | 12(2) | OpCode | (s)|(r)|PadC|TVer | PKey | |
| | 13(3) | ( resv8a (variant) ) | DQP | | |
| | 14(4) | ( resv 7 ) | ( PSN ) | | |
| DETH | 15(5) | QKey | | | |
| | 16(6) | ( resv ) | | | |
| MAD | 17(7) | Base Version | MgmtClass | Class Version | R | Method6 |
| | 18(8) | D | ( Status ) | HopPointer | HopCount |
| | 19(9) | ( Transaction_ID_1 ) | | | |
| | 20(10) | ( Transaction_ID_2 ) | | | |
| | 21(11) | Attribute ID | | ( Reserved 1 or 2 ) | ( Reserved 1 or 2 ) |
| | 22(12) | Attribute Modifier | | | |
| | 23(13) | MKey_1/BKey_1 | | | |
| | 24(14) | MKey_1/BKey_2 | | | |
| | 25(15) | DrSLID | | DrDLID | |
| | ... | ( MAD Data ) | | | |
| | 80(70) | ( MAD Data ) | | | |
| | 81(71) | ICRC | | | |

Fig. 5

METHOD AND MANAGEMENT PORT FOR AN INDIRECT LOOP PROTOCOL ASSOCIATED WITH AN INTERCONNECT DEVICE

FIELD OF THE INVENTION

The present invention relates generally to the field of data communications and, more specifically, to a method and management port for an indirect loop protocol associated with device in a communications network.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources are handled at a central arbiter. An arbitration scheme may further employ one of a number of arbitration policies, including a round robin policy, a first-come-first-serve policy, a shortest message first policy or a priority based policy, to name but a few. The physical properties of the IBA interconnect technology have been designed to support both module-to-module (board) interconnects (e.g., computer systems that support I/O module add in slots) and chasis-to-chasis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

SUMMARY OF THE INVENTION

A method and management port for an indirect loop protocol associated with an interconnect device are disclosed. According to one aspect of the invention, a method to handle a request sent to an interconnect device includes receiving the request at a destination switch from a host network adapter; generating a response to the request in the destination switch; and returning the response to the host network adapter, wherein the destination switch includes a management port for addressing the interconnect device that implements an indirect loop protocol.

According to a further embodiment, there is provided a system to handle a request sent to an interconnect device. The system comprises: means for receiving the request at a decoder of a management port; means for determining a performance requirement associated with the request; means for routing the request to an agent to execute the request when the performance requirement matches an agent's performance capability; means for routing the request to a microprocessor interface when the performance requirement does not match the agent's performance capability; means for routing the request to a microprocessor from the microprocessor interfaces; means for processing the request by the microprocessor; means for generating a response by the microprocessor; means for routing the response to the microprocessor interface; means for routing the response from the interface to a requesting node; and means for bypassing the agent when the agent's performance capability does not match the performance requirement.

In another embodiment, there is provided a system to handle a request sent to an interconnect device. The system comprises: means for receiving the request at a decoder of a management port; means for determining a performance requirement associated with the request; means for routing the request to an agent to execute the request when the performance requirement matches an agent's performance capability; means for routing the request to a microprocessor from the microprocessor interface; means for altering the performance requirement to match the agent's performance capability to generate a second request; means for routing the second request to the microprocessor interface from the microprocessor; means for receiving the second request at the decoder; means for routing the second request to the agent; means for generating a first response by the agent; means for routing the first response to the microprocessor; means for altering the first response by the microprocessor to generate a second response; and means for routing the second response to the requesting node, wherein the first response is a first trap packet, and wherein the second response is a second trap packet.

In another embodiment, there is provided a machine readable medium. The machine readable medium has embodied thereon a description of a circuit in a hardware description language, the description comprising a series of instructions which, when executed by a processor, synthesize a circuit comprising: a decoder for receiving requests for managing an interconnect device, the decoder implementing an indirect loop protocol; a microprocessor interface coupled to the decoder; one or more agents coupled to the decoder; and a data bus interconnecting the decoder, microprocessor interface, and agents.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 is an exemplary datagram of a request packet received by the decoder of FIG. 4 according to one embodiment of the present invention.

DETAILED DESCRIPTION

A method and management port for an indirect loop protocol associated with an interconnect device are described. In the following description, for purposes of explanation, numerous specific details are set forth in order to provide a thorough understanding of the present invention. It will be evident, however, to one skilled in the art that the present invention may be practiced without these specific details.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; and flash memory devices.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 2A:
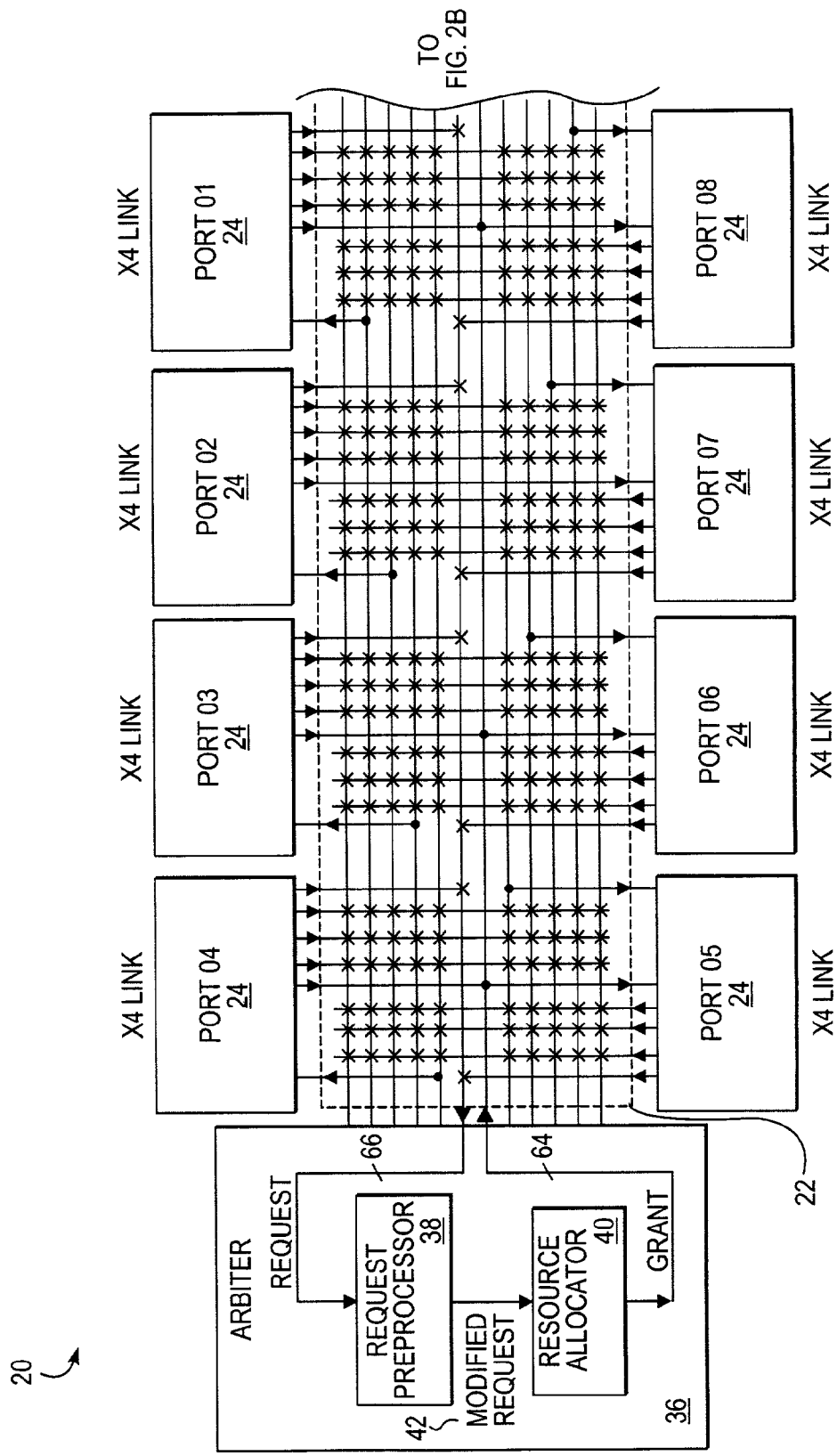
FIGS. 2A and 2B provide a diagrammatic representation of a data path, according to an exemplary embodiment of the present invention, implemented within an interconnect device (e.g., a switch).
Figure 2B:
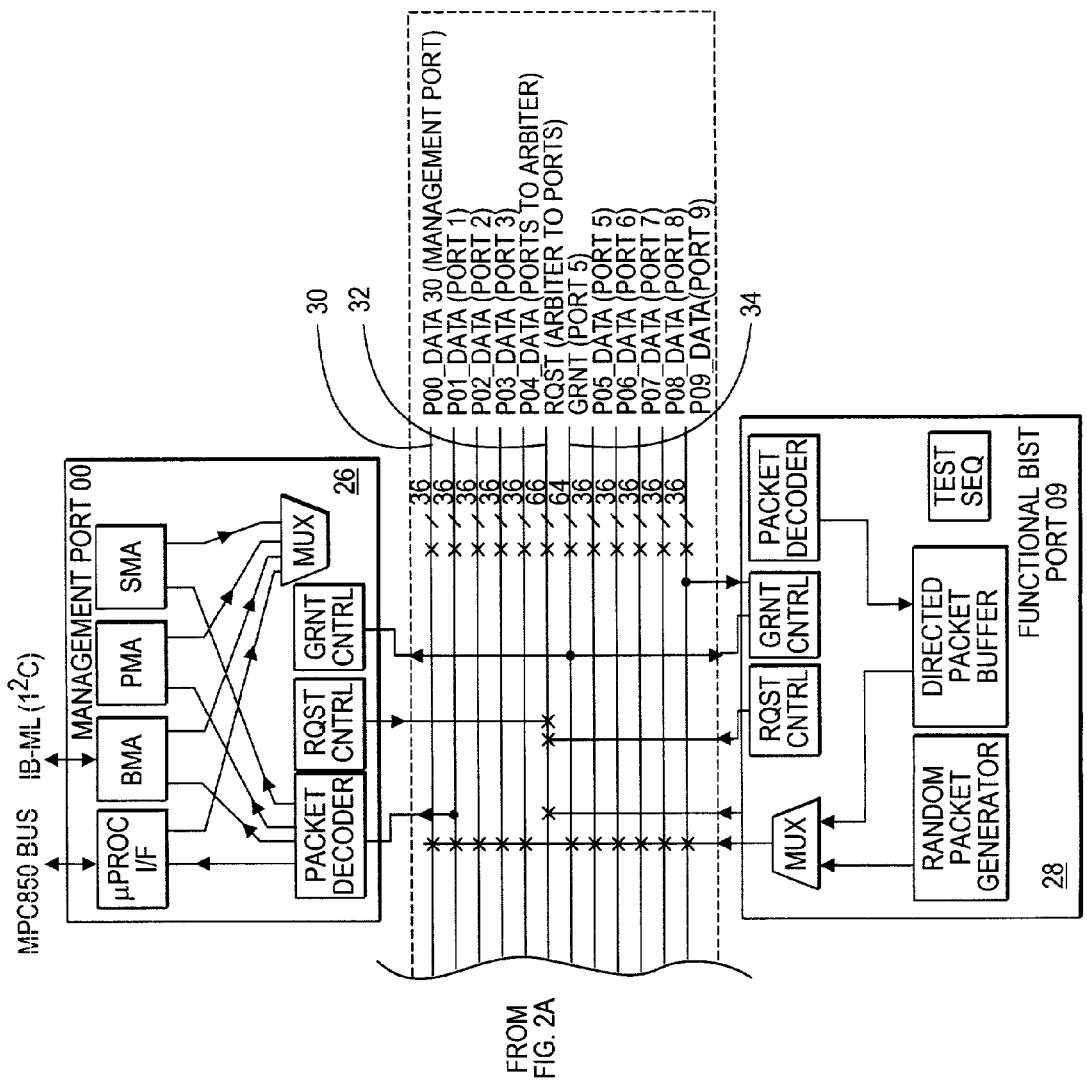

FIGS. 2A and 2B provide a diagrammatic representation of a datapath 20, according to an exemplary embodiment of the present invention, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar are eight communication ports 24 that issue resource requests to an arbiter 36 via the request bus 32, and that receive resource grants from the arbiter 36 via the grant bus 34.

In addition to the eight communication ports, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

Management port 26 is an end node, which implies that any messages passed to port 26 terminate their journey there. Thus, management port 26 is used to address an interconnect device, such as the switches of FIG. 1. Thus, through management port 26, key information and measurements may be obtained regarding performance of ports 24, the status of each port 24, diagnostics of arbiter 36, and routing tables for network switching fabric 10. This key information is obtained by sending packet requests to port 26 and directing the requests to either the SMA, PMA, or BMA. This will be discussed in greater detail below.

The functional BIST port 28 supports stand-alone, at-speed testing of an interconnect device embodying the datapath 20. The functional BIST port 28 includes a random packet generator, a directed packet buffer and a return packet checker.

Figure 3:
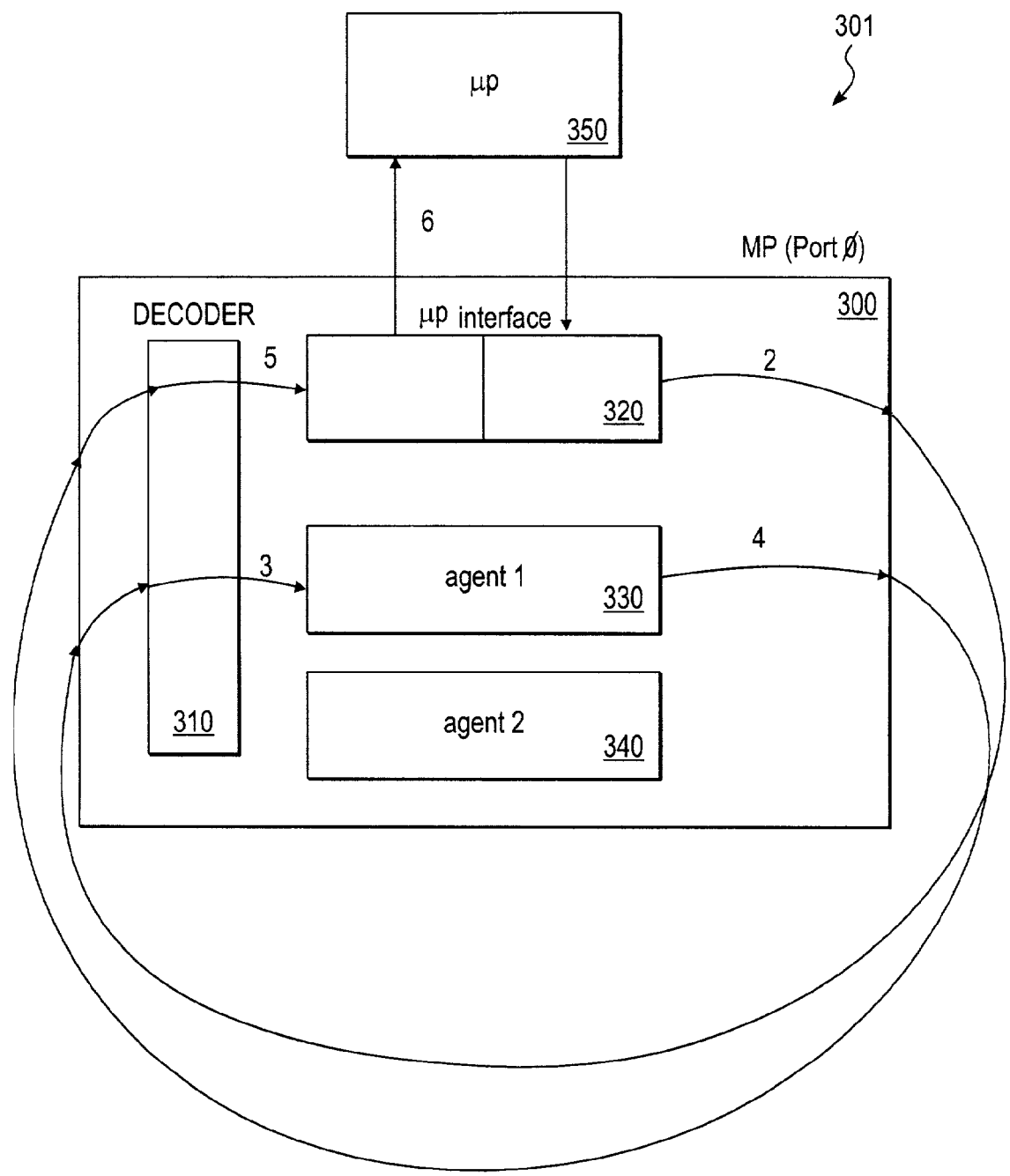
FIG. 3 illustrates a detailed functional block diagram of management port 300 that implements an indirect loop protocol, according to one embodiment of the present invention.

FIG. 3 illustrates a detailed functional block diagram of management port 300 that implements an indirect loop protocol, according to one embodiment of the present invention. FIG. 3 also shows the flow of requests within management port 300 and with microprocessor 350. Management port 300 may be implemented as management port 26.

Figure 1:
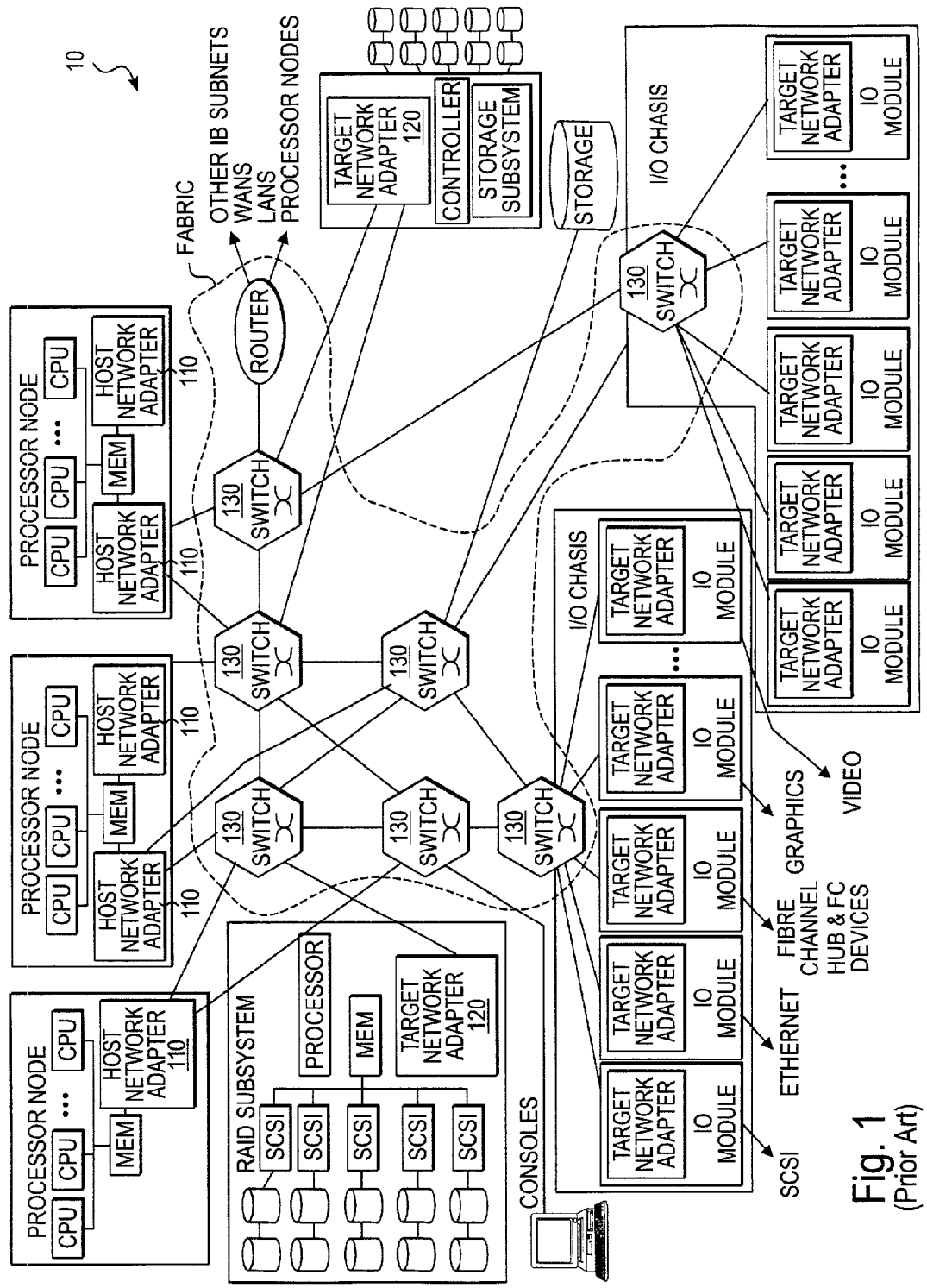
FIG. 1 is a diagrammatic representation of a System Area Network, according to the prior art, as supported by a switch fabric.
Figure 4:
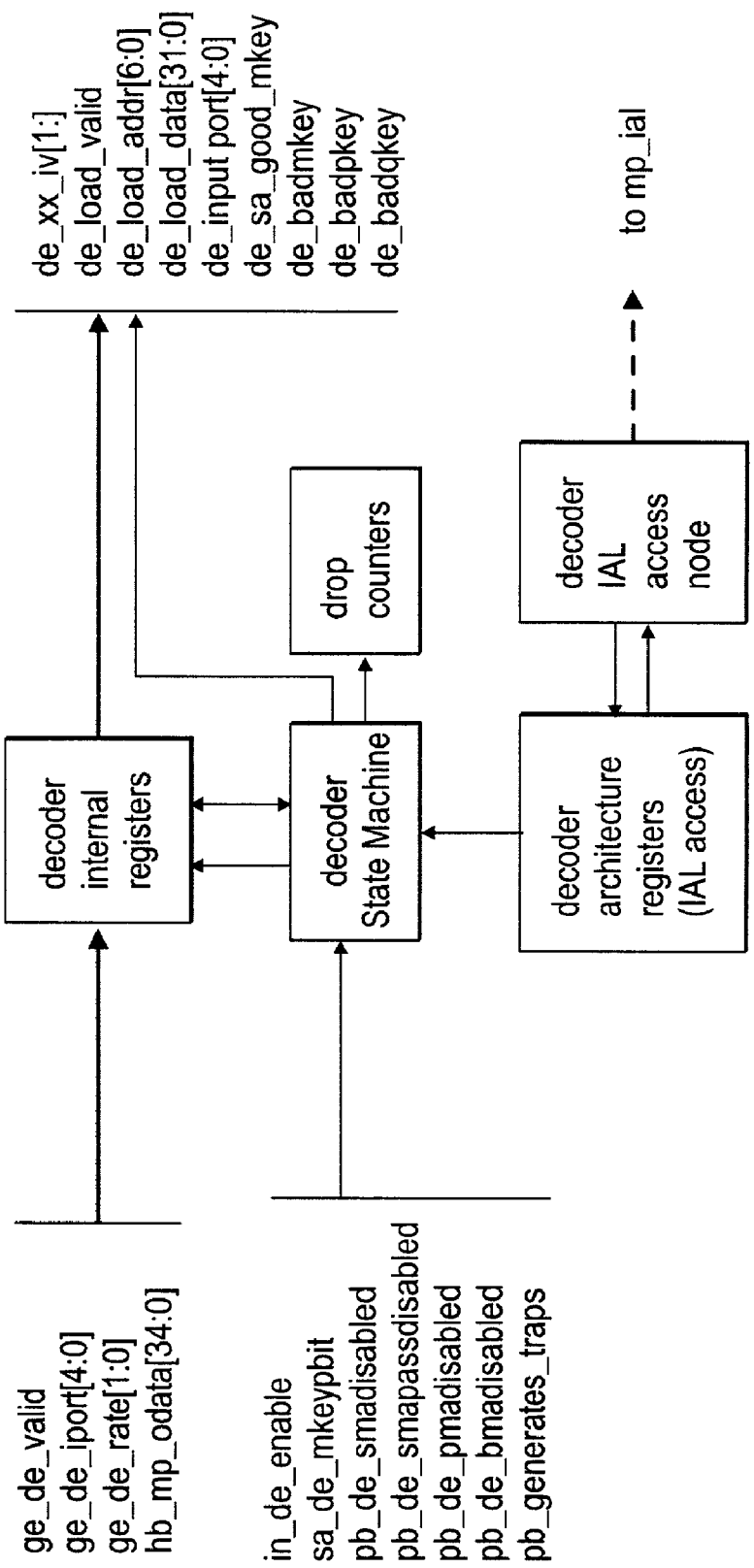
FIG. 4 illustrates an exemplary decoder according to one embodiment of the present invention.

Management port 300 includes a decoder 310 which may be designed, as shown in FIG. 4, having internal registers, a decoder state machine, drop counters, architecture registers, and an access node, although other decoder designs are contemplated to be within the spirit and scope of the present invention. Decoder 310 analyzes incoming request packets to determine which agent 330, 340 will handle the request and generate a response. Port 300 also includes a microprocessor interface 320 for passing requests and responses back and forth to external microprocessor 350. Within port 300 are one or more agents, such as agent 1 330 and agent 2 340. Each agent may be a subnet management agent (SMA), a baseboard management agent (BMA) or a performance management agent (PMA). The agents 330, 340 generate a response packet to the requester. Often, the requester is a corresponding manager (i.e., subnet manager's requests are responded to by the subnet management agent) which is a software entity executed on a processor node, physically external to switching fabric 10, as seen in FIG. 1. However, Subnet Manager, Baseboard Manager, and Performance Manager can also run on the microprocessor 350, architecturally hiding under the management port 300 within fabric 10, as well.

Management port 300, operating under normal conditions, executes all requests using the hardware components of port 300, without needing microprocessor 350. However, situations may occur when access to microprocessor 350 is desirable through an indirect loop protocol to properly respond to the requests. One situation may be when a new version of an agent (e.g., agent 1 330) is needed, but the hardware (agent 1 330) cannot be physically changed. More specifically, a new version is needed any time an agent receives a packet containing many fields, where if any field is beyond the capabilities of what the agent can perform, the packet bypasses the agent and is sent to the microprocessor 350. For example, within the packet there are numerous version numbers including LVER, IP Vers, Base Version, and class version. Any of these version numbers mismatched will result in the decoder 310 dispatching the request packet to the microprocessor 350 to bypass the agent. Beyond the version numbers, there are potential mismatched packet fields, such as Queue Pair (QP) numbers, Management Classes, and Method types (e.g., read versus write). Any of these packet fields that are beyond the hardware agent's performance capabilities will result in the forwarding of the packet to the microprocessor 350. A second situation occurs when agent 1 330 malfunctions and is bypassed. In these cases it is desirable to fully emulate the agent 1 330 using software executed on microprocessor 350. Thus, "performance capability mismatches" between a request packet and hardware agent include the situations described above as well as other similar situations described below.

In the situations described above the decoder 310 receives a request packet. The packet may have a packet format shown in FIG. 5. In one embodiment involving Base Versions, if the packet indicates that a newer agent version is required, through analysis of the Base Version field of word 17(7), than that of agent 1 330, the request is sent from decoder 310 to the microprocessor interface 320. Likewise, if the agent 330 is disabled or bypassed, the request is sent to interface 320. Interface 320 passes the request to microprocessor 350. Microprocessor 350 emulates the required version of agent 330 and generates a response packet. The response packet is returned to the microprocessor interface 320, which then routes the response back to the requester. Although described with respect to a Base Version, other mismatches noted above are handled similarly.

Another situation may occur, where use of the microprocessor 350 is desirable. This situation also deals with performance capability mismatches of an agent 330, where agent 330 is capable of performing only a portion of the request. In this case, the agent is not bypassed completely, however, the remainder of the request that is unable to be completed by the agent is performed by the microprocessor 350, and a combined response is returned to the requester.

Figure 6:
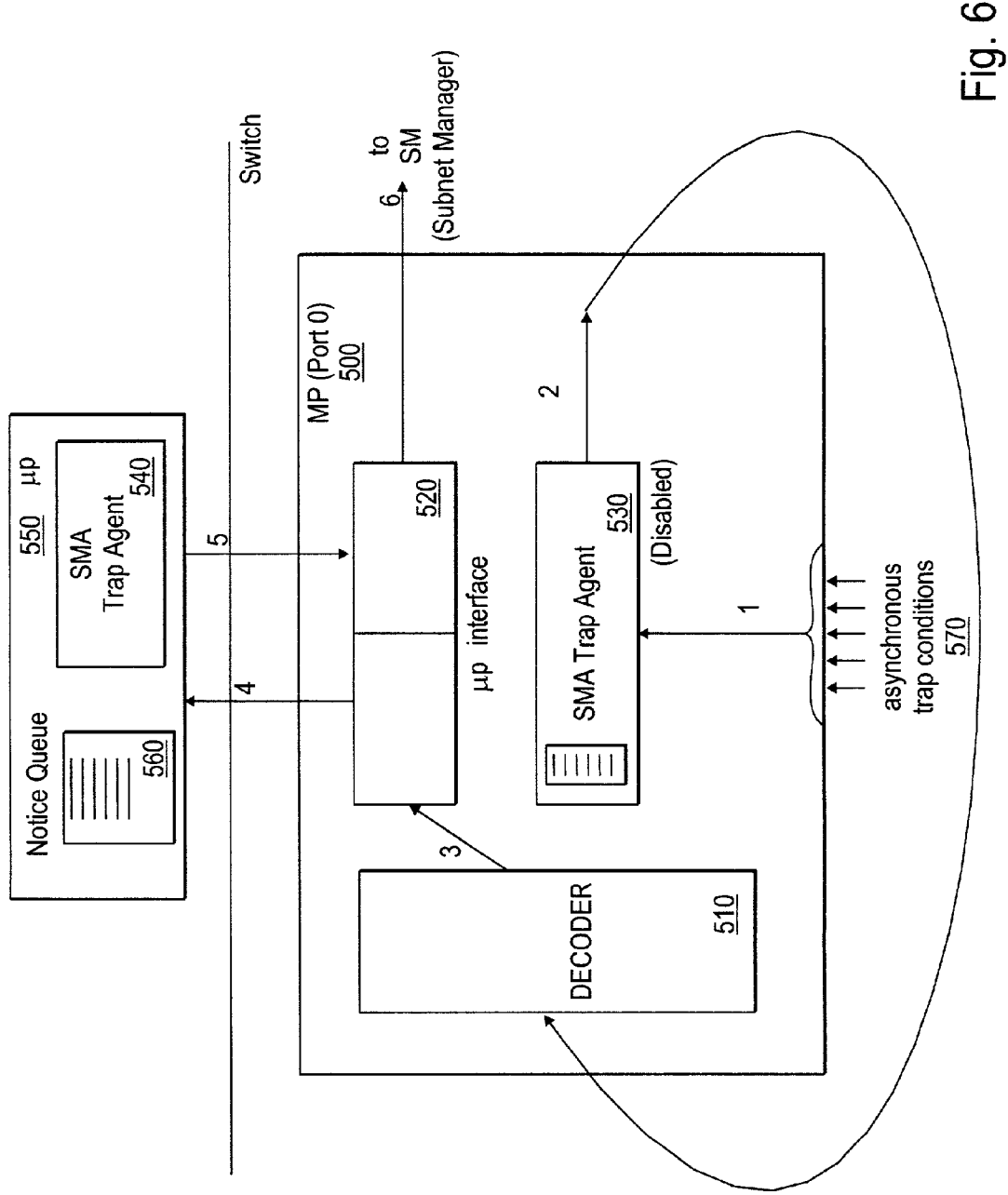
FIG. 6 illustrates a block diagram of an exemplary microprocessor and management port configuration using an indirect loop protocol for handling trap conditions.

FIG. 6 illustrates a block diagram of an exemplary microprocessor and management port configuration using an indirect loop protocol for handling trap conditions. A trap condition refers to unexpected events that are defined by the InfiniBand™ architecture. They are monitored by the interconnect device and reported to the subnet manager in the trap packet form. Two exemplary types of traps include synchronous and asynchronous traps. A synchronous trap occurs when a packet is received, and there are predefined violations found in it. For example, it occurs when a management key contained in the packet is invalid. An asynchronous trap exists when the time of occurrence of the trap is not scheduled or expected. For example, an asynchronous trap occurs when the physical linkage to and from a port goes down.

Management port 500 includes a microprocessor interface 520 for communications between microprocessor 550 and management port 500. Decoder 510 may be a decoder as shown in FIG. 4. Management port 500 also includes a subnetwork management (SMA) trap agent 530. Microprocessor 550 emulates Trap Agent 530 in software trap agent 540, and maintains a notice queue 560. FIG. 6 illustrates the flow of an asynchronous trap condition 570 when hardware trap agent 530 is disabled. First, the trap condition is sent to disabled trap agent 530. Agent 530 sends the trap condition 570 in a trap packet to decoder 510, which passes the condition on to microprocessor interface 520. Interface 520 passes the asynchronous condition trap packet to microprocessor 550. Microprocessor 550 updates the notice queue 560 with the trap condition 570. Software trap agent 540 generates a response by modifying the trap condition trap packet slightly. The software trap agent 540 then sends the final trap packet to the microprocessor interface 520. Finally, interface 520 sends the trap packet to the subnetwork manager (SM).

When the SMA Trap Agent 530 is not disabled, both synchronous traps and asynchronous traps are handled by it. When the SMA Trap Agent 530 is disabled or bypassed, the management port 500 does not handle the synchronous trap, instead, it is forwarded to the microprocessor 550. A software decoder running on the microprocessor 550 detects the trap condition and then forwards the trap condition to the emulated SMA Trap Agent 540 for handling. When the SMA Trap Agent 530 is disabled or bypassed, the asynchronous trap is still handled by the SMA Trap Agent 530 in a different manner. SMA Trap Agent 530 still generates a trap packet as before, but with the destination target being the microprocessor 550 instead of the original Subnet Manager. The microprocessor 550 receives this trap packet and then forwards it to the emulated SMA Trap Agent 540 to generate an updated trap packet that targets the originating Subnet Manager. The indirect loop protocol is involved in the asynchronous trap packet routing when the SMA Trap Agent 530 is disabled.

Referring back to FIG. 1, one sees that there are numerous host network adapters 110 and target network adapters 120. Management port 26 also functions to generate routing tables so that hosts 110 and targets 120 may communicate. The routing tables say which end nodes to deliver requests to. Each node surrounding fabric 10 has a local ID associated with it. Switches 130 store routing tables that list all the node IDs surrounding fabric 10 and to which port of the switch a request should be routed in order to reach the desired end node.

When switching fabric 10 is first powered up, the routing tables contain no information and the table must be built-up. The table is built using a direct route scheme in which data packets consisting of explicit routing information are sent through switches 130 to targets 120. Direct routing of packets is slower than local ID (LID) routing which uses the routing table to quickly route packets through a switch's 130 appropriate port. Direct routing is slower because the payload section of the data packet of FIG. 5 must be analyzed to obtain routing information. LID routing only analyses the data packet's header information.

Figure 7:
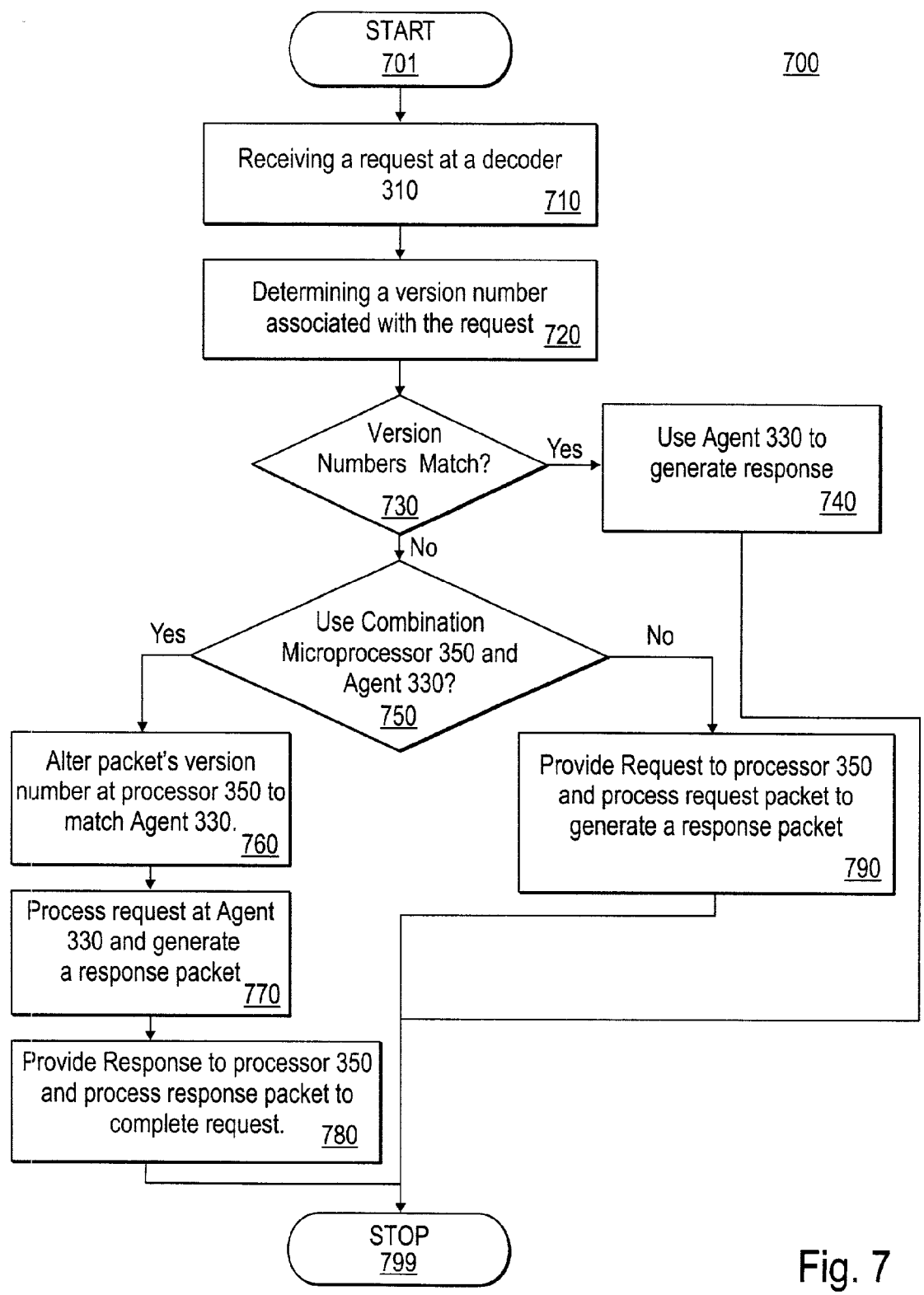
FIG. 7 is an exemplary flow diagram of the indirect loop protocol processing performed by system 301 for handling requests to the management port 300.

FIG. 7 is an exemplary flow diagram of the indirect loop protocol processing performed by system 301 for handling requests to the management port 300. The process commences at block 701. A request is received at decoder 310. Decoder 310 determines the version number associated with the request at processing block 720.

Flow continues to decision block 730 where the decoder 310 determines if the packet's version number matches the version of the agent 330. If the versions are the same, flow continues to processing block 740, where agent 330 is used to generate a response to the requester, upon which flow terminates at block 799. If the version numbers do not match, flow continues to decision block 750 where the decoder 310 determines if only an emulated agent should be used or a combination of the emulated agent and hardware agent 330. If a combination is not used, flow continues to processing block 790 where the request is provided to microprocessor 350, which processes the request and generates a response packet. The response will then be routed to the requester via the microprocessor interface 320, upon which flow terminates at block 799.

If a combination is used at decision block 750, the request is routed to microprocessor 350 via interface 320. At processing block 760, the request packet's version number is altered to match agent's 330 version number. The altered request is routed to the agent 330 via interface 320 and decoder 310. Decoder 310 seeing a matching version number routes the altered request to agent 330 who processes the altered request and generates a response packet, at processing block 770. Flow continues to processing block 780 where the response is routed to microprocessor 350 since it was the "requester" that generated the altered request. Microprocessor 350 alters the response to generate a new response packet, consistent with the new agent version number associated with the original request packet. The new response is provided to the requestor and flow terminates at block 799.

Thus, a method and management port for an indirect loop protocol associated with an interconnect device, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to handle a request sent to an interconnect device, the method comprising:
   receiving the request at a decoder of a management port;
   determining a performance requirement associated with the request;
   routing the request to an agent to execute the request when the performance requirement matches an agent's performance capability; and
   routing the request to a microprocessor interface when the performance requirement does not match the agent's performance capability.

2. The method of claim 1, further comprising:
   routing the request to a microprocessor from the microprocessor interfaces;
   processing the request by the microprocessor;
   generating a response by the microprocessor;
   routing the response to the microprocessor interface; and
   routing the response from the interface to a requesting node.

3. The method of claim 2, further comprising:
   disabling the agent when the agent's performance capability does not match the performance requirement.

4. The method of claim 1, further comprising:
   routing the request to a microprocessor from the microprocessor interface;
   altering the performance requirement to match the agent's performance capability to generate a second request;
   routing the second request to the microprocessor interface from the microprocessor;
   receiving the second request at the decoder;
   routing the second request to the agent;
   processing the second request at the agent;
   generating a first response by the agent;
   routing the first response to the microprocessor;
   altering the first response by the microprocessor to generate a second response; and
   routing the second response to the requesting node.

5. The method of claim 4, wherein the first response is a first trap packet, and wherein the second response is a second trap packet.

6. A system to handle a request sent to an interconnect device comprising:
   means for receiving the request at a decoder of a management port;
   means for determining a performance requirement associated with the request;
   means for routing the request to an agent to execute the request when the performance requirement matches an agent's performance capability; and
   means for routing the request to a microprocessor interface when the performance requirement does not match the agent's performance capability.

7. The system of claim 6, further comprising:
   means for routing the request to a microprocessor from the microprocessor interfaces;
   means for processing the request by the microprocessor;
   means for generating a response by the microprocessor;
   means for routing the response to the microprocessor interface; and means for routing the response from the interface to a requesting node.

8. The system of claim 7, further comprising:
means for bypassing the agent when the agent's performance capability does not match the performance requirement.

9. The system of claim 6, further comprising:
means for routing the request to a microprocessor from the microprocessor interface;
means for altering the performance requirement to match the agent's performance capability to generate a second request;
means for routing the second request to the microprocessor interface from the microprocessor;
means for receiving the second request at the decoder;
means for routing the second request to the agent;
means for generating a first response by the agent;
means for routing the first response to the microprocessor;
means for altering the first response by the microprocessor to generate a second response; and
means for routing the second response to the requesting node.

10. The system of claim 9, wherein the first response is a first trap packet, and wherein the second response is a second trap packet.

11. A computer-readable medium having stored thereon a plurality of instructions, said plurality of instructions when executed for handling a request sent to an interconnect device by a computer, cause said computer to perform:
receiving the request at a decoder of a management port;
determining a performance requirement associated with the request;
routing the request to an agent to execute the request when the performance requirement matches an agent's performance capability; and
routing the request to a microprocessor interface when the performance requirement does not match the agent's performance capability.

12. The computer-readable medium of claim 11 having stored thereon additional instructions, said additional instructions when executed by a computer, cause said computer to further perform:
routing the request to a microprocessor from the microprocessor interfaces;
processing the request by the microprocessor;
generating a response by the microprocessor;
routing the response to the microprocessor interface; and
routing the response from the interface to a requesting node.

13. The computer-readable medium of claim 12 having stored thereon additional instructions, said additional instructions when executed by a computer, cause said computer to further perform:
bypassing the agent when the agent's performance capability does not match the performance requirement.

14. The computer-readable medium of claim 11 having stored thereon additional instructions, said additional instructions when executed by a computer, cause said computer to further perform:
routing the request to a microprocessor from the microprocessor interface;
altering the performance requirement to match the agent's performance capability to generate a second request;
routing the second request to the microprocessor interface from the microprocessor;
receiving the second request at the decoder;
routing the second request to the agent;
processor the second request at the agent;
generating a response by the agent;
routing the response to the microprocessor;
altering the response by the microprocessor to generate a second response; and
routing the second response to the requesting node.

15. The computer-readable medium of claim 14, wherein the first response is a first trap packet, and wherein the second response is a second trap packet.

16. A management port for an interconnect device, comprising:
a decoder for receiving requests for managing the interconnect device, the decoder implementing an indirect loop protocol;
a microprocessor interface coupled to the decoder;
one or more agents coupled to the decoder; and
a data bus interconnecting the decoder, microprocessor interface, and agents, wherein the requests comprise:
a request for the performance measurements of the interconnect device;
a request for the status of one or more ports within the interconnect device; and
a request for the diagnosis of an arbiter within the interconnect device.

17. The management port of claim 16, wherein the agents comprise:
a sub-network management agent;
a baseboard management agent;
a performance management agent; and
a sub-network trap management agent.

18. The management port of claim 17, wherein the management port generates a routing table with local IDs each associated with a plurality of interconnect devices.

19. The management port of claim 17, wherein the decoder:
determines a performance requirement associated with the request;
routes the request to an agent to execute the request when the performance requirement matches an agent's performance capability of the agent; and
routes the request to the microprocessor interface when the performance requirement does not match the agent's performance capability.

20. The management port of claim 19, wherein the microprocessor interface provides the request to a microprocessor and receives a response packet from the microprocessor.

21. A machine-readable medium having embodied thereon a description of a circuit in a hardware description language, the description comprising a series of instructions which, when executed by a processor, synthesize a circuit comprising:
a decoder for receiving requests for managing an interconnect device, the decoder implementing an indirect loop protocol;
a microprocessor interface coupled to the decoder;
one or more agents coupled to the decoder; and
a data bus interconnecting the decoder, microprocessor interface, and agents.

22. The machine-readable medium of claim 21 wherein the description includes a behavioral level description of the circuit.

23. The machine-readable medium of claim 22 wherein the behavioral level description is compatible with a VHDL format.

24. The machine-readable medium of claim 23 wherein the behavioral level description is compatible with a Verilog format.

25. The machine-readable medium of claim 21 wherein the description includes a register transfer level netlist.

26. The machine-readable medium of claim 21 wherein the description includes a transistor level netlist.

* * * * *